F. H. ROBERTS.
Hand Seeder.
No. 41,784.   Patented Mar. 1, 1864.
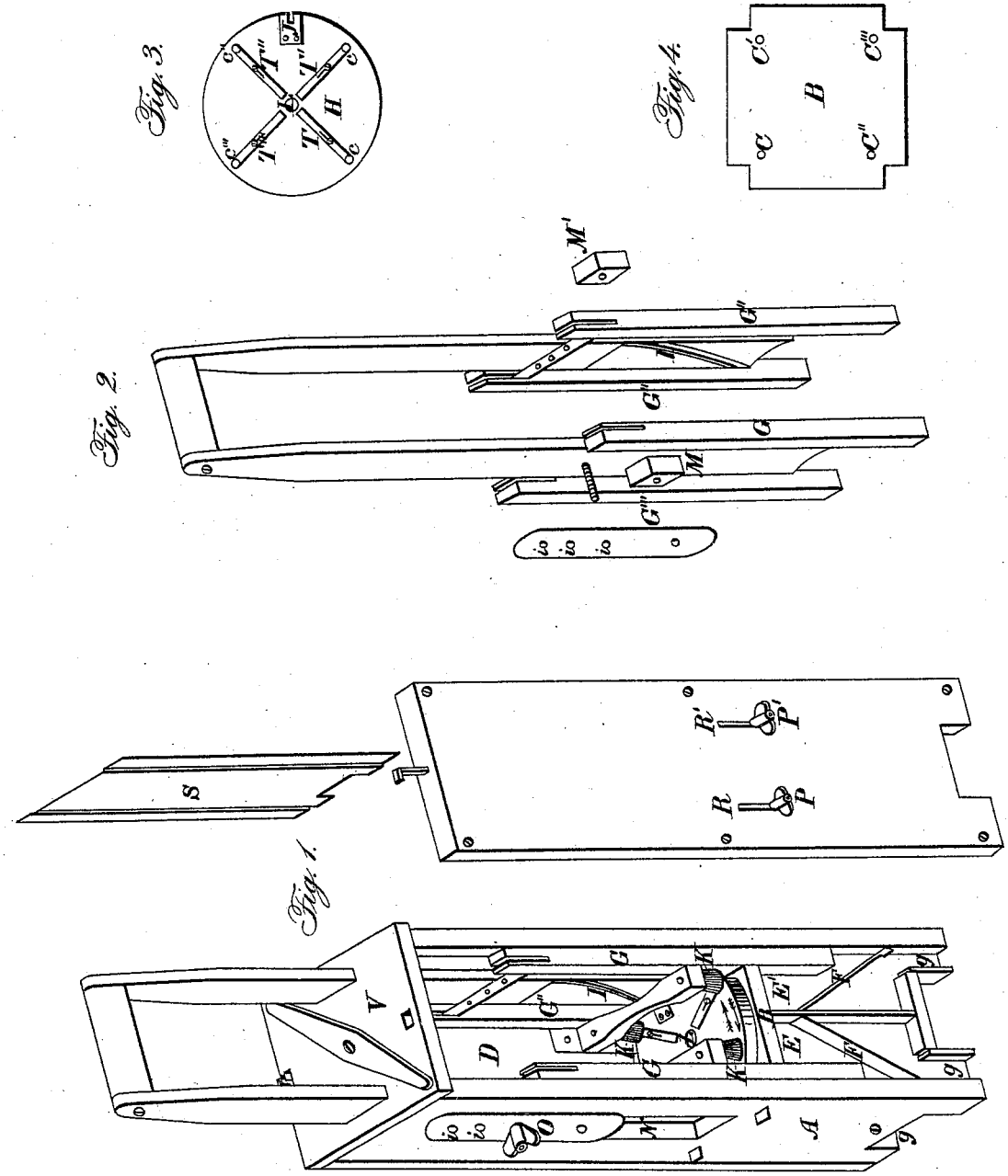
Witnesses:
James H. Layman
Q. R. Conouis
Inventor:
F. H. Roberts
pr Knight Bro
atty

UNITED STATES PATENT OFFICE.

FRANCIS H. ROBERTS, OF WILMINGTON, INDIANA.

IMPROVEMENT IN HAND-PLANTERS.

Specification forming part of Letters Patent No. 41,784, dated March 1, 1864; antedated February 21, 1864.

*To all whom it may concern:*

Be it known that I, FRANCIS H. ROBERTS, of Wilmington, Dearborn county, Indiana, have invented a new and useful Hand Corn-Planter; and I do hereby declare the following to be a full, clear, and exact description thereof, reference being had to the annexed drawing, making part of this specification.

A is a square tube or box, having a little below its mid-height a floor, B, provided with four apertures, C C' C'' C''', which communicate from the upper chamber or magazine, D, with four corner-pockets, E E' E'' E''', of which two, E E', are shown. One side of each pocket is formed by a spring, F.

G G' G'' G''' are rods, forming parts of a four-parted piston or plunger, and occupying sockets $g$ $g'$ $g''$ $g'''$ at the corners of the box.

The floor B has a central pivot, L, to hold a circular disk, H, which is made to partially rotate back and forth by means of a bar, I, attached obliquely to the plunger and engaging in a notch, J, in the periphery of the disk.

T T' T'' T''' are adjustable registers to enable the regulation of the size of the apertures C C' C'' C''' in the disk H.

Brushes K K' K'' K''', attached (by means of adjustable screws P P', occupying slots R R') to the sides of the box and sweeping the top of the disk, prevent more than a single grain getting into either cavity of the disk.

I govern the stroke of the plunger both upward and downward and prevent too great a concussion at the ends of the stroke by the employment of adjustable cushioned stops M M', of caoutchouc or other suitable substance, attached to the plunger and working in slots N in the box-sides. The cushioned stops M M' also serve the further useful purpose of greatly facilitating the return-stroke both upward and downward, and thus materially relieving the labor of working the implement. The adjustable attachment of the cushioned stops M M' is made by means of thumb-screws O and apertures $i$. By adjusting the cushioned stops M M' up or down the pistons may be caused to plant the seed deep or shallow, as may be desired.

In order to enable a proper penetration of the ground, the sockets $g$ $g'$ $g''$ $g'''$ project in the form of feet a few inches below the bottom of the box.

S is one of two similar partitions to prevent the corn working down alongside of the plunger.

V is the cover, which being opened permits the charging of the magazine D, and being closed serves to steady the plunger.

Operation: The magazine D being charged with grain and the cover V closed, the implement is ready for use. The lifting of the implement from one hill to another acts of course to elevate the plunger, which in turn operates to vibrate the disk H, so as to bring its apertures in line with those of the floor B and allow a kernel to drop into each pocket, to be pushed into the next hill on the redescent of the implement.

I do not claim the seeding devices herein described; but

What I claim as my invention is—

Combining therewith the adjustable elastic stops M M', substantially as described.

In testimony of which invention I hereunto set my hand.

FRANCIS H. ROBERTS.

Witnesses:
GEO. H. KNIGHT,
JAMES R. CHALLEN.